US008156508B2

(12) United States Patent
Tommasi et al.

(10) Patent No.: US 8,156,508 B2
(45) Date of Patent: Apr. 10, 2012

(54) METHOD FOR RUNTIME EXECUTION OF ONE OR MORE TASKS DEFINED IN A WORKFLOW PROCESS LANGUAGE

(75) Inventors: Allesandro Tommasi, Viareggio (IT); Cesare Zavattari, Diecimo (IT); Harald Schöning, Dieburg (DE); Andreas Frohlich, Darmstadt (DE); Michael Gesmann, Darmstadt (DE)

(73) Assignee: Software AG, Darmstadt (DE)

( * ) Notice: Subject to any disclaimer, the term of this patent is extended or adjusted under 35 U.S.C. 154(b) by 1101 days.

(21) Appl. No.: 11/949,146

(22) Filed: Dec. 3, 2007

(65) Prior Publication Data

US 2008/0222635 A1 Sep. 11, 2008

(30) Foreign Application Priority Data

Dec. 21, 2006 (EP) .................................. 06026538

(51) Int. Cl.
*G06F 9/44* (2006.01)
(52) U.S. Cl. ........ 719/328; 717/100; 717/111; 717/104; 717/105; 717/122; 717/136; 717/144
(58) Field of Classification Search .................. None
See application file for complete search history.

(56) References Cited

U.S. PATENT DOCUMENTS

| 7,168,035 | B1 * | 1/2007 | Bell et al. ..................... 715/234 |
| 2004/0162741 | A1 | 8/2004 | Flaxer et al. | |
| 2005/0034107 | A1 * | 2/2005 | Kendall et al. ................ 717/136 |
| 2007/0106541 | A1 * | 5/2007 | Raisanen ........................ 705/7 |
| 2007/0299799 | A1 * | 12/2007 | Meehan et al. ................ 706/46 |
| 2008/0320486 | A1 * | 12/2008 | Bose et al. .................... 718/105 |

FOREIGN PATENT DOCUMENTS

EP 1643431 4/2006

OTHER PUBLICATIONS

Anand Ranganathan, A Task Execution Framework for Autonomic Ubiquitous Computing, B.Tech., Indian Institute of Technology, Madras, 2000.*
Natalya F. Noy and Mark A. Musen, Ontology Versioning as an Element of an Ontology-Management Framework, Mar. 31, 2003.*
Chung, et al., "Knowledge-based process management—an approach to handling adaptive workflow", Knowledge-Based Systems, Elsevier UK, vol. 16, No. 3, Apr. 2003, pp. 149-160, retrieved from Internet: http://dx.doi.org/10.1016/S0950-7051(02)00080-1.

(Continued)

*Primary Examiner* — Van H Nguyen
*Assistant Examiner* — Dong Kim
(74) *Attorney, Agent, or Firm* — Meyertons Hood Kivlin Kowert & Goetzel, P.C.; Jeffrey C. Hood

(57) ABSTRACT

Runtime execution of one or more tasks defined in a workflow process language. The method may include obtaining a description of the task from a process ontology (PO). The PO may define a hierarchical taxonomy of executable tasks, where each task refers to at least one frame of a hierarchical frame taxonomy of the PO. The method may further include identifying at least one parameter as described in the frame description to which the task refers, resolving the value of the at least one parameter, and executing the most specific applicable version of the task contained in the task taxonomy of the process ontology.

20 Claims, 4 Drawing Sheets

OTHER PUBLICATIONS

Figure 1:
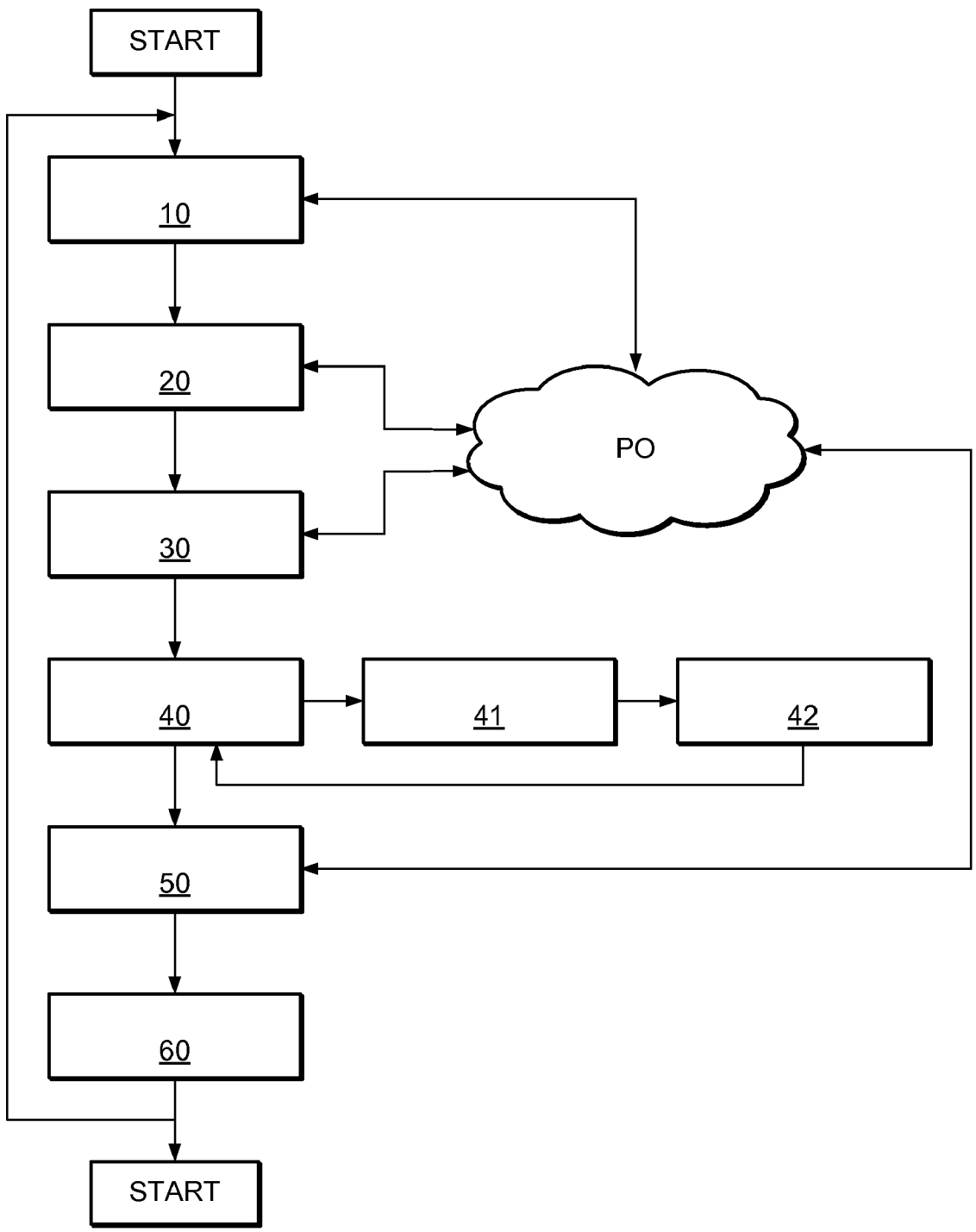

Vieira, et al., "An Ontology-driven Architecture for Flexible Workflow Execution", WebMedia and LA-Web Joint Conference proceedings, 2004, Ribeirao Preto, Brazil, Oct. 12-15, 2004, IEEE, Piscataway, New Jersey, USA, Oct. 12, 2004, pp. 70-77.

Beco, et al., "OWL-WS: A Workflow Ontology for Dynamic Grid Service Composition", E-Science and gring Computing, First International Conference, Pittsburg, PA, Dec. 5-8, 2005, IEEE, Piscataway, New Jersey, Dec. 5, 2005, pp. 148-155.

European Search Report for application No. EP 06 02 6538, search completed May 30, 2007.

* cited by examiner

METHOD FOR RUNTIME EXECUTION OF ONE OR MORE TASKS DEFINED IN A WORKFLOW PROCESS LANGUAGE

PRIORITY CLAIM

This application claims benefit of priority of European application no. 06 026 538.6 titled "Method for Runtime Execution of One or More Tasks Defined in a Workflow Process Language", filed Dec. 21, 2006, and whose inventors are Alessandro Tommasi, Cesare Zavattari, Harald Schöning, Andreas Frohlich, and Michael Gesmann.

INCORPORATION BY REFERENCE

European application no. 06 026 538.6 titled "Method for Runtime Execution of One or More Tasks Defined in a Workflow Process Language", filed Dec. 21, 2006, and whose inventors are Alessandro Tommasi, Cesare Zavattari, Harald Schöning, Andreas Frohlich, and Michael Gesmann, is hereby incorporated by reference in its entirety as though fully and completely set forth herein.

TECHNICAL FIELD

The present application relates to workflow environments and more particularly to a method for runtime execution of one or more tasks defined in a workflow process language.

DESCRIPTION OF THE RELATED ART

Describing the flow of complex processes in the real world by means of software is difficult. In a typical workflow management system of the prior art, the overall process is defined using simple languages such as XPDL or BEPL, wherein a process is defined in terms of "tasks" composed by a set of standard constructors, such as split, sequence, join etc, and operating in a statically defined flat environment.

A particular difficulty for workflow management systems is the constantly changing nature of the processes of the real world to be described. One way of addressing this difficulty is the use of a so-called service oriented architecture (SOA), wherein a number of loosely coupled (web) services send and receive messages to perform the overall process. The services selected to perform the workflow and their logical interconnection is defined at design time. Accordingly, all possible alternatives and variations of the workflow must be pre-defined using sub-tasks and suitable interface definitions. If the underlying process in the real world changes, or if new aspects are to be reflected, the workflow must be redefined by a developer.

As a practical example, a financial institution such as a bank may change the online access for a user to his account from the input of the account number to the input of a unique user identification. In case of such a (minor) modification of the real world workflow, the process definition by a workflow management system of the prior art would need to be altered in order to enable the modified user input. However, incorporating such changes is technically demanding and requires a great amount of expertise, which is typically not available with the persons administrating such a workflow system.

Accordingly, improvements in workflow management systems are desired.

SUMMARY OF THE INVENTION

Various embodiments are presented of a method for runtime execution of one or more tasks defined in a workflow process language.

The method may include obtaining a description of the task from a process ontology. The process ontology may define a hierarchical taxonomy of executable tasks and each task may refer to at least one frame of a hierarchical frame taxonomy of the process ontology. The method may further include identifying at least one parameter as described in the frame description to which the task refers, resolving the value of the at least one parameter, and executing the most specific applicable version of the task contained in the task taxonomy of the process ontology.

Accordingly, the overall process may no longer be composed of a static, pre-determined sequence of actions of one or more (web) services. Instead, the workflow may be determined at runtime by a process ontology, which may provide information about the tasks that compose an abstract process definition. The process ontology may include two hierarchical taxonomies: the task taxonomy and the frame taxonomy. The first describes the specialization relation between tasks and the selection criteria, while the second describes the process environment.

The method may allow for the definition of a process in terms of high-level, abstract, generic statements such as:
MakeRelease=
  Check current version out of CVS;
  Compile;
  Make package.

In this simple example, the overall "MakeRelease" process is composed of three tasks in sequence, which are rarely implemented twice the same way. The method may allow for expressing several variations of this process in a uniform and concise way that is both flexible and adaptive. The process ontology may provide descriptions and/or specific versions for each of the three tasks that are at runtime chosen based on the specific value of the process parameters.

For example, there may be multiple specific versions of the "checkout" task for the same overall process. This task may have two or more specific versions, which are applicable depending, for example, on whether the repository used for this task is local or remote and/or based on the operating system run by a client machine. Similarly, the "compile" task may have more specific versions that refer to different building systems, while the final "make package" task may be applicable depending on a target operating system (OS) and other parameters. As a result, the method may not require redefining the abstract definition and performing such things as adding branches to a conditional node, all over a flat environment.

In some embodiments, resolving the parameter may include sending a message to a source indicated in the frame description, if the parameter value is not defined in a current process environment. The message may include a value type and a role of the required value, the role reflecting the relation of the parameter to other data of the process environment. The type of the value may be defined in a domain ontology.

The domain ontology may describe elements of the domain that are handled by the system during the process execution such as "OS type", "building system". This feature serves two main purposes: It defines a type system more elaborate than typical workflow definition languages and allows the expression of relations, i.e., roles performed by the parameters in a process. By adding this further dimension, input parameters and their values can be provided to a task by virtue of their properties, rather than by their name.

The provision of the information contained in the domain and process ontology allows, at runtime, a "verticalization" of the process by the execution engine due to the specialization and instantiation of abstract process steps relying on the task and data modelling provided by the process and domain ontologies.

In some embodiments, executing the most specific applicable version of the task may include verifying whether the process ontology includes a more specific applicable version of the task and, if so, executing the more specific applicable version of the task with the resolved parameter values. The verification step may include for each of the one or more specific tasks examining one or more constraints for determining the applicability of the more specific task. The one or more specific applicable task may be executed only if all of its constraints are met.

The one or more constraints may be defined in a task description of the more specific task as one or more constraints on the parameter values of the parameters for the respective more generic task. In addition, the description of each task may include various attributes defining, for example, the frame it refers to, one or more input parameters, one or more output parameters and a reference to an implementation of the task, which may refer to an external agent, such as a web service.

The constraints may be used to determine the applicability of the more specific task with respect to the execution of the respective generic task: When the process reaches a generic task, one or more of its more specific tasks may be chosen by the execution engine according to the satisfaction of said constraints. In some embodiments, constraints can be expressed in any form supported by the domain ontology: It could be equality of the value, subtyping, relations with other elements in the domain ontology or in the process environment.

In one embodiment, the method may be performed by an interpreter interpreting a plurality of statements in a workflow process language such a BEPL or XPDL and/or an execution engine.

SHORT DESCRIPTION OF THE DRAWINGS

Figure 2:
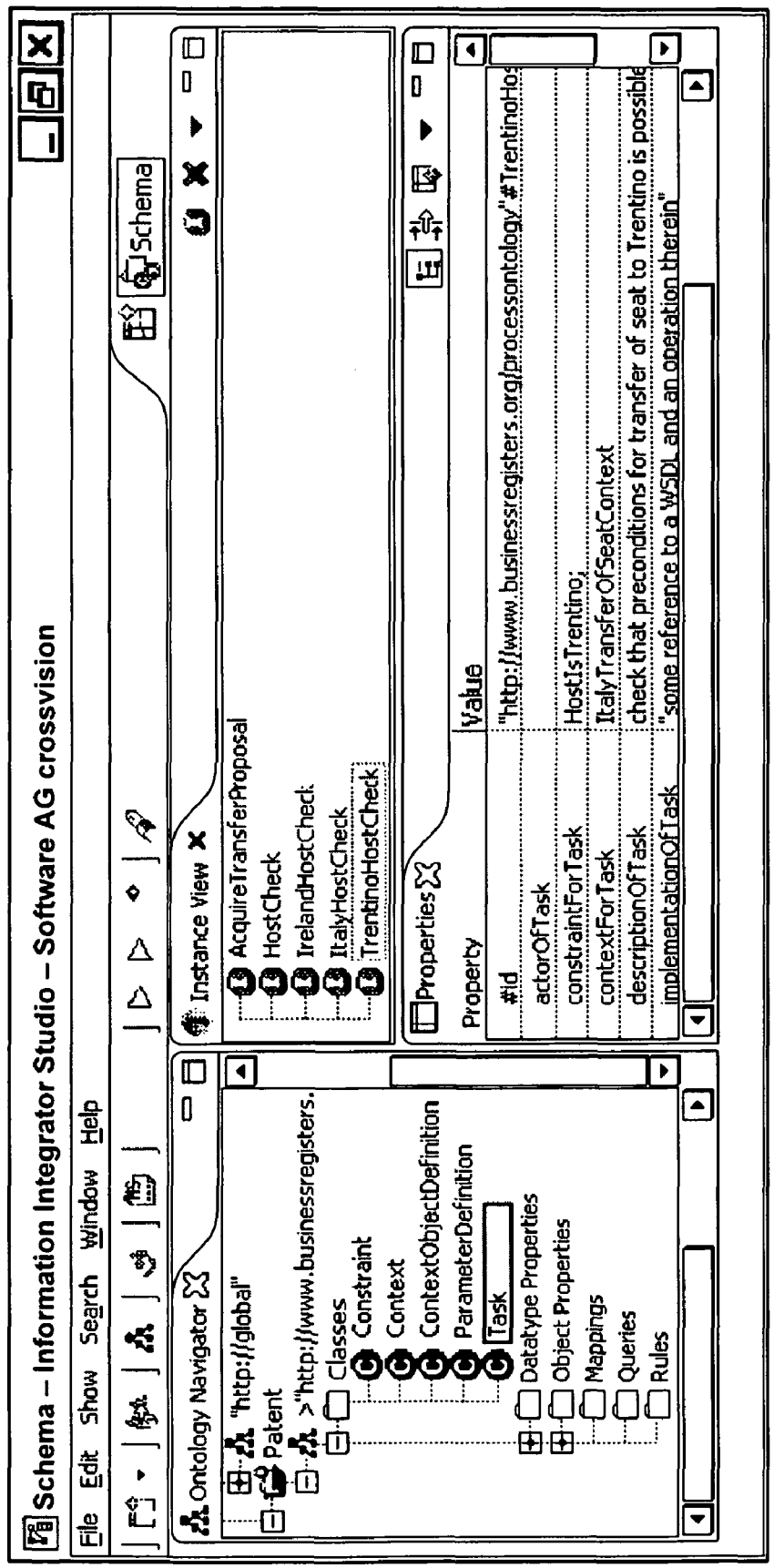
Figure 3:
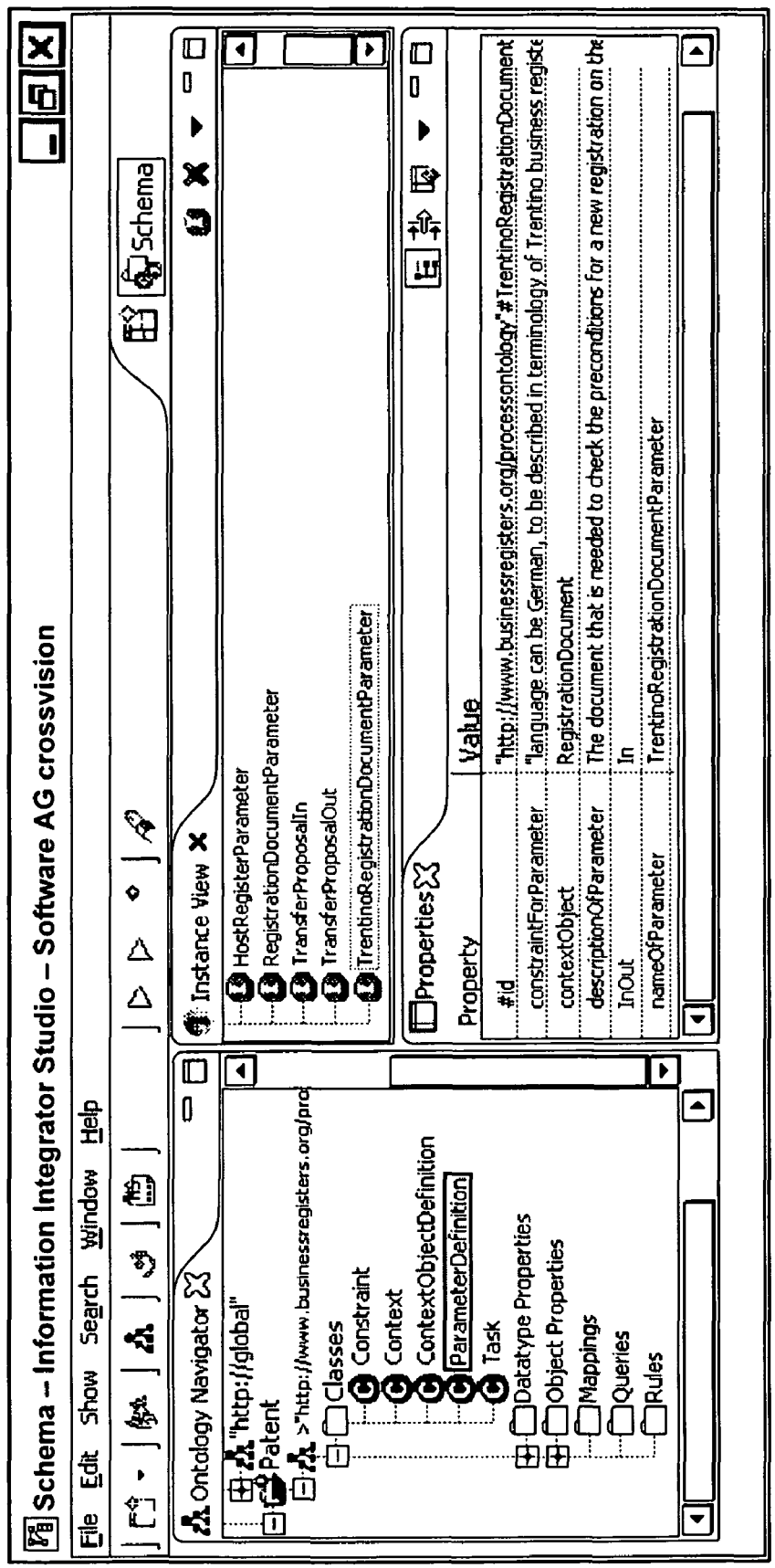
Figure 4:
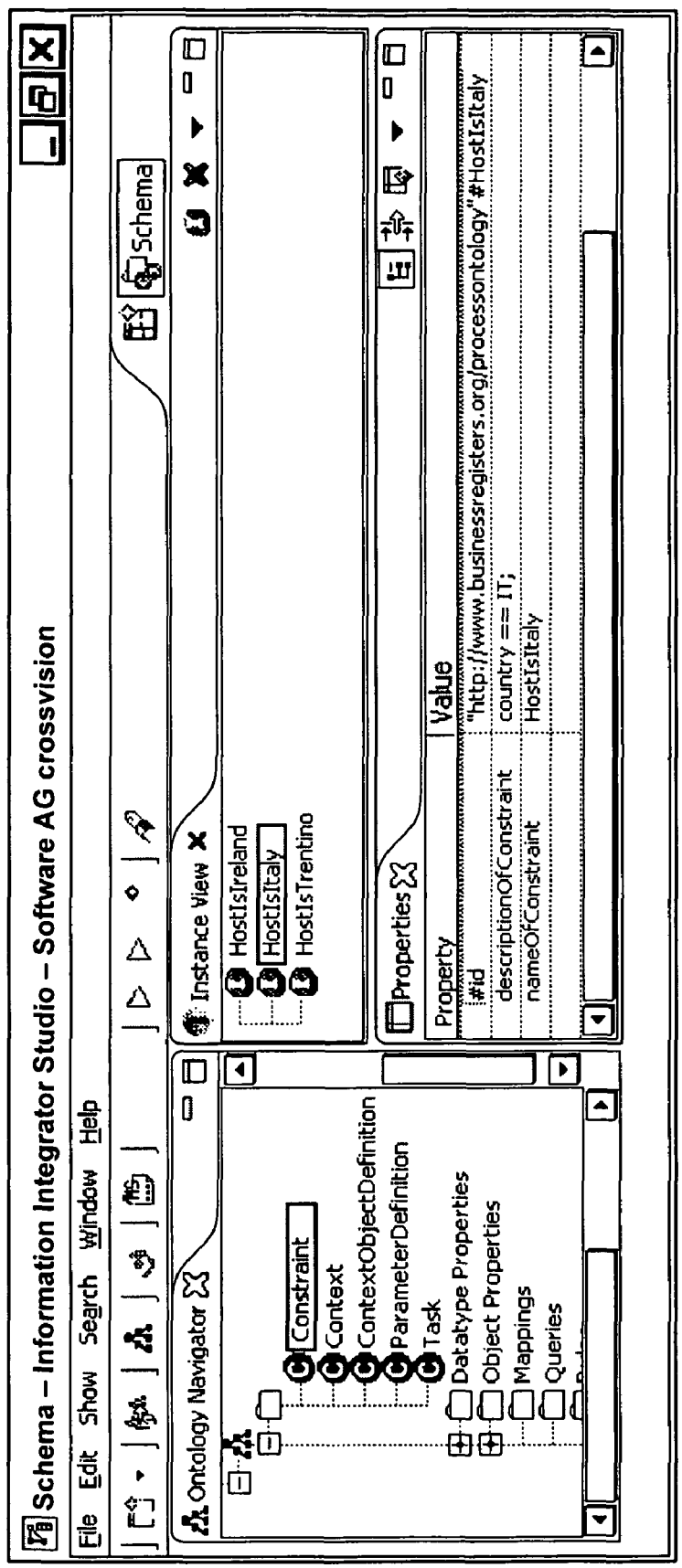

In the following detailed description, a presently preferred embodiment is described with reference to the drawing, wherein:

FIG. 1: presents a flow chart illustrating the steps performed by the execution engine at runtime in a method according to an embodiment; and FIGS. 2-4: screenshots of an embodiment of the invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

In the following, the task taxonomy, the process environment and the process definition of an embodiment are described before the steps performed at runtime by the execution engine are discussed with reference to FIG. 1.

A. The Task Taxonomy

The task taxonomy of the process ontology is actually a forest with a tree for each task in the abstract process definition. Any task of this taxonomy may comprise a more specific version and a more generic version. More specific versions of a task are called its hypotasks, whereas the more generic version of a task is called its hypertask. The description of each task also provides the following attributes:

the frame it refers to
a set of input parameters whose type and meaning are specified in the frame definition
a set of output parameters whose type and meaning are specified in the frame definition
a set of constraints on the hypertask parameters values
a reference to an implementation The input parameters may specify what elements are required by the task in order to proceed with the execution, while the output parameters tell what new elements may be provided by the task execution to the process environment. Each parameter has a formal name that is bound to a name in the frame—therefore specifying a type and a role for the parameter. The parameters refer by default to the frame the task refers to.

The task may also specify additional constraints on the values of some of the parameters defined by its hypertask (that can be defined in the same frame, or in a super frame, see section B. below). These constraints may be used to determine at runtime the applicability of one or more hypotasks with respect to the execution of a certain task: when the process reaches the task, one or more of its hypotasks are chosen according to the satisfaction of said constraints.

EXAMPLES

Say that task A has an hypotask B.

Say that A has an input parameter x that gathered from the frame to be of type T.

B could express some constraints on the value of x that determine its applicability in a certain circumstance, such as:

x==1 (x is 1), or x:T' (x is of type T' subtype of T), or x[father->abraham] (the father of x is 'abraham')

abraham[son->>x] (x is one of abraham's sons)

Whenever two or more hypotasks of a certain task have constraints which are simultaneously satisfied, the system may be non-deterministic. Non-determinism can be used to apply machine learning in order to let the system find out by itself what path has the best performance, which is also a viable option to perform simulation. On the contrary, in embodiments or situations where non-determinism is undesired, the conditions defining the applicability of a task's hypotasks must be mutually exclusive, which can be verified by means of model checking.

The task taxonomy may be accessed at runtime by the process interpreter of the execution engine to find out whether the task currently to be executed can be substituted by one of its hypotasks, by virtue of the specific state of the process.

B. The Process Environment

The structure of the runtime environment for process execution may be declared in the process ontology. The environment may be composed of a hierarchy of frames. A frame is a collection of data needed by a set of tasks that belong to the same workflow. Sometimes frames are also called contexts. The frame taxonomy may also be hierarchically structured. A frame extends and/or may override the declarations of its super frame. The frame hierarchy may be preferably related to the task taxonomy in the process ontology, where a task may need other data in addition to the data of the respective hypertask.

As will become more apparent from the description of the steps performed during runtime below, frames may be persistent to allow context-specific reusable data to live across different execution steps.

The declaration of the data hosted by the frame taxonomy of the process environment may be tightly defined in a domain ontology. In particular, a datum declaration may consist of:

Name: an identifier that must be unique in the current frame

Type: specified by a link to a domain ontology concept

Source: where this piece of data must be fetched from. This can point either to an instance of the domain ontology (if this can be determined at design time) or to one of the workflow's participants, which is in charge of providing the value.

Role: Since the proposed system is completely described by the ontologies, the way to retrieve data from sources must be highly flexible and preferably avoids hardcoded queries. The type alone is not sufficient to identify the information the process is looking for. The attribute 'role' will describe semantic relationships used to outline the role that this piece of data has in the current process.

EXAMPLE

If the address of the CEO of a company is to be retrieved, a query like:

X of type 'AddressOfCEOOfCompany' is not preferred. Instead a query like:

X of type 'Address', where (X addressOfY) & (Y ceoOfC)

is preferred. The parameter 'C' may be fetched from the current process environment allowing for additional flexibility in the expression of the role.

C. Process Definition

The overall, high-level process to be executed by the execution engine may be defined by composing tasks described in the process ontology. The composition operators may include:

Sequence (T1 T2 T3), wherein T1, T2 and T3 are tasks

Split/join (and T1 T2)

Conditional (if cond T1 T2)

Iterator (while (cond) T)

For defining the abstract process, any existing workflow language can be used that offers such operators (e.g. BPEL) as long as the respective execution machine for the language implements the method according to the present invention.

The tasks may share data in the current environment which, thanks to the frame structure, allows context specific data available for just a subset of tasks across the process.

D. Runtime Execution

In the following, the process by which the interpreter executes a task is described with reference to FIG. 1. As will be seen, the most specific task of the task taxonomy in the process ontology may be chosen depending on the current process state. This is called the selection rule.

The interpreter may hold, for the process, an environment structured as previously described. For each generic task T defined in section C., the following steps may be performed by the execution engine.

Step 10: It fetches the description of task T from the process ontology PO

Step 20: It finds out the frame description for task T

Step 30 It identifies the task parameters as described in the relative frame Step 40: It goes through the parameter list. Each input parameter may be determined for a value in the current process environment, in respect to the frame definition. For each "missing" value, a message 41 may be sent to the source 42 of the relative datum, as defined in the frame description in the process ontology PO. The message 41 may carry along the value type and the "semantic" description (role) of the required value, as from the frame definition, to allow the source 42 to fulfil the request.

Step 50: Once all the input parameters are available, the requirements of the task T may be fulfilled, and the task T may therefore be a candidate for execution. However, chances are that the process ontology PO carries the definition of a more specific version of this task. Therefore, the hypotasks of task T may be fetched from the process ontology PO, and each may be considered as an execution candidate. For each hypotask T', the constraints, i.e. conditions to be met by the task T's input parameters values, may be examined. When at least one of the constraints is not met, the hypotask T' is not considered to be a valid candidate.

Step 60: If no hypotask T' turns out to be a valid execution candidate, then task T is the most specific version of the task available, and can be executed. If one or more hypotasks T' are available, one is selected (in the case of multiple available candidates, by means of priority or other disambiguation rule, or non-deterministically).

The sequence of steps 10-60 may be repeated for every task T contained in the process definition.

The described execution method, i.e. the selection rule, ensures that the most specific version applicable is selected based on the value of the input parameters. Once this task is selected, its implementation can be executed as described in section E. below.

E. Task Implementation

A task can have a concrete implementation, i.e. a way to invoke an external agent in order to enact an external process and eventually to retrieve the values to be assigned to the output parameters specified by the task description. Such values may be stored in the environment frame in which the parameters were defined and shared by other tasks operating in the subtree rooted in the same frame. The external agent could be anything, ranging from a standard workflow engine to a service accessible by a web service interface, or even another abstract workflow engine, in a hierarchical structure.

F. Annex

Appendix I is an exemplary XML-file for embodying the task hierarchy of the ontology, in one embodiment of the invention. This is an example for providing a workflow for a transfer of a seat of a company from one EU country to another one. Since business registers are differently organized throughout the EU, for example as a centralized institution in Ireland, attached to the local courts in Germany and decentralized in Italy, all of these differences are to be taken into account for modeling a workflow for this process, even if some steps are always the same for every change of a seat of a company within the EU.

In the present example of Appendix I, there is always a new registration to be performed, which requires a verification of a proper establishment of the company. The verification step comprises a verification, whether the name of the company meets the requirements of the receiving country, and/or whether all documents a presented in a proper format (if necessary with a confirmation of a notary public). This verification step depends on which business registers are involved.

A workflow describing this process should comprise this verification step in a generic but flexible manner. This is because it is unknown at design time which countries are involved in a concrete case. This is only known after a certain company has specifically requested a transfer of its seat from one EU country to another. Further, the available EU countries may change. The ontology used for the workflow shown in Appendix I therefore describes the various characteristics of this verification step depending on the involved business registers. For example, in the case of an Irish business register, the verification step is comparatively easy, whereas Italy requires the presentation of a document confirmed by a notary public. If the registration is in the autonomous Trentino region of Italy, the documents can also be presented in German. Otherwise it must be in Italian language. The input parameters required for the verification step therefore result only from the description in the ontology and can therefore be flexibly adapted without influencing the generic definition of the overall process.

To facilitate the understanding of the XML example of Appendix I, FIGS. 2-4 present examples of screenshots illustrating how the task hierarchy, the constraints and the parameters are presented to the user in this specific embodiment of the invention.

FIG. 2 presents a first screenshot showing in the Instance View various tasks of the hierarchy. For example the task "HostCheck" has three hypotasks namely "IrelandHostCheck", "ItalyHostCheck" and "TrentinoHostCheck". Since the task TrentinoHostCheck is selected in FIG. 2, the Properties Window displays the description of this task and its various attributes. For example, the constraints for this task are "HostisTrentino", i.e., the TrentinoHostCheck task is only applicable as a more specific version of the task HostCheck if this condition is met. In the XML file of Appendix I, the sections of the onotology corresponding to the screenshot of FIG. 2 can be found by looking for the code lines with the definitions of the respective (hypo) tasks.

FIG. 3 presents another screenshot illustrating in the Instance View various parameters. The Properties Window again shows properties concerning the parameter highlighted in the Instance View, in this case the TrentinoRegistrationDocumentParameter. One of the properties is the constraint that the language can be in German. Corresponding definitions of this parameter can again be found in the XML document of Appendix I containing the ontology for this embodiment.

FIG. 4 finally presents a screen shot illustrating a constraint. The Instance View highlights the constraint "HostisItaly". The property window describes the constraint as the equality country=IT. Again, XML definitions corresponding to the screenshot can be found in the ontology listed in Appendix I.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method for runtime execution of one or more tasks defined in a workflow process language, the method comprising:

at runtime:
obtaining a description of the one or more tasks from a process ontology (PO), the process ontology (PO) defining a hierarchical taxonomy of executable tasks, each task referring to at least one frame of a hierarchical frame taxonomy of the process ontology (PO);
identifying at least one task parameter as described in the frame description to which the task refers;
resolving the value of the at least one task parameter, wherein said resolving comprises determining the value of the at least one task parameter;
selecting a most specific applicable version of the task from a plurality of versions of the task contained in the task taxonomy of the process ontology (PO) based on the resolved value of the at least one task parameter;
executing the most specific applicable version of the task; and
storing results of said executing in a memory, wherein the results are usable for managing a process.

2. The method of claim 1, wherein said resolving comprises sending a message to a source indicated in the frame description, if the parameter value is not defined in a current process environment.

3. The method of claim 2, wherein the message comprises a value type and a role of the required value, the role reflecting the relation of the parameter to other data of the process environment.

4. The method of claim 3, wherein the type of the value is defined in a domain ontology.

5. The method of claim 1, wherein said executing comprises verifying whether the process ontology (PO) comprises a more specific applicable version of the task and, if so, executing the more specific applicable version of the task with the resolved parameter values.

6. The method of claim 5, wherein there are more than one more specific tasks and wherein the verification step comprises, for each of the one or more specific tasks, examining one or more constraints for determining the applicability of the more specific task.

7. The method of claim 6, wherein the one or more specific applicable task is executed only if all of its constraints are met.

8. The method of claim 6, wherein the one or more constraints are defined in a task description of the more specific task as one or more constraints on the parameter values of the parameters for the task.

9. The method of claim 1, wherein the description of each task comprises attributes defining the frame it refers to, one or more input parameters, one or more output parameters and a reference to an implementation of the task.

10. The method of claim 9, wherein the reference to an implementation refers to an external agent, in particular a web service.

11. A non-transitory computer-accessible memory medium comprising program instructions for runtime execution of one or more tasks defined in a workflow process language, wherein the program instructions are executable by a processor to:

at runtime:
obtain a description of the one or more tasks from a process ontology (PO), the process ontology (PO) defining a hierarchical taxonomy of executable tasks, each task referring to at least one frame of a hierarchical frame taxonomy of the process ontology (PO);
identify at least one task parameter as described in the frame description to which the task refers;
resolve the value of the at least one task parameter, comprising determining the value of the at least one task parameter;
select a most specific applicable version of the task from a plurality of versions of the task contained in the task taxonomy of the process ontology (PO) based on the resolved value of the at least one task parameter;
execute the most specific applicable version of the task.

12. The non-transitory computer-accessible memory medium of claim 11, wherein said resolving comprises sending a message to a source indicated in the frame description, if the parameter value is not defined in a current process environment.

13. The non-transitory computer-accessible memory medium of claim 12, wherein the message comprises a value type and a role of the required value, the role reflecting the relation of the parameter to other data of the process environment.

14. The non-transitory computer-accessible memory medium of claim 13, wherein the type of the value is defined in a domain ontology.

15. The non-transitory computer-accessible memory medium of claim 11, wherein said executing comprises verifying whether the process ontology (PO) comprises a more specific applicable version of the task and, if so, executing the more specific applicable version of the task with the resolved parameter values.

16. The non-transitory computer-accessible memory medium of claim 15, wherein there are more than one more specific tasks and wherein the verification step comprises, for each of the one or more specific tasks, examining one or more constraints for determining the applicability of the more specific task.

17. The non-transitory computer-accessible memory medium of claim 16, wherein the one or more specific applicable task is executed only if all of its constraints are met.

18. The non-transitory computer-accessible memory medium of claim 16, wherein the one or more constraints are defined in a task description of the more specific task as one or more constraints on the parameter values of the parameters for the task.

19. The non-transitory computer-accessible memory medium of claim 11, wherein the description of each task comprises attributes defining the frame it refers to, one or more input parameters, one or more output parameters and a reference to an implementation of the task.

20. The non-transitory computer-accessible memory medium of claim 19, wherein the reference to an implementation refers to an external agent, in particular a web service.

* * * * *